(12) United States Patent
Katsuda

(10) Patent No.: US 7,299,494 B2
(45) Date of Patent: Nov. 20, 2007

(54) FILE MANAGEMENT METHOD AND FILES

(75) Inventor: Takeo Katsuda, Tokyo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 751 days.

(21) Appl. No.: 09/860,435

(22) Filed: May 21, 2001

(65) Prior Publication Data

US 2001/0047447 A1   Nov. 29, 2001

(30) Foreign Application Priority Data

May 25, 2000   (JP)   ............................. 2000-155325

(51) Int. Cl.
G06F 7/04 (2006.01)
H04L 9/00 (2006.01)
G06F 17/30 (2006.01)
G06F 12/00 (2006.01)
G06K 9/00 (2006.01)
H04N 7/167 (2006.01)

(52) U.S. Cl. .............. 726/7; 726/31; 726/32; 726/33; 726/34; 713/165; 713/166; 713/167; 380/201; 380/229; 380/230; 380/231; 707/200; 707/201; 707/202; 707/203

(58) Field of Classification Search .............. 711/1, 711/113, 4; 707/200; 709/206; 713/165–167, 713/188–189; 726/27–35; 380/201

See application file for complete search history.

(56) References Cited

U.S. PATENT DOCUMENTS 5,161,214 A * 11/1992 Addink et al. ................. 707/1
5,987,536 A * 11/1999 Johnson et al. ............... 710/36
2003/0126215 A1* 7/2003 Udell et al. .................. 709/206

FOREIGN PATENT DOCUMENTS

WO          98/58321       12/1998
WO      WO 9858321    * 12/1998

* cited by examiner

Primary Examiner—Ayaz Sheikh
Assistant Examiner—Longbit Chai
(74) Attorney, Agent, or Firm—Buchanan Ingersoll & Rooney PC

(57) ABSTRACT

The invention relates to a method of managing files. In this invention, a method of managing a file stored in an external memory device of a computer having an application that starts when it is read by the computer consists of a step of accepting an instruction for starting up the application, and a step of automatically deleting the application program from the external memory device when the started application terminates. This file managing method can automatically delete the application program from the external memory device when the started application terminates.

10 Claims, 8 Drawing Sheets

(A)

14    29  28  27  26

| 01 | 01 | 01 | 01 | 01 | 01 |
| 01 | 01 | 01 | 01 | 01 | 01 |

25  24  23  22  21  20

(B)   14

| 01 | 01 | 01 | 01 | 01 | 01 |
| 01 | 01 |

(A)

(B)

| 47 | |
|---|---|
| COUNTING DATA | DISPLAY DATA |
| BLOCK 20 | DATE 12a |
| BLOCK 21 | DATE 12b |
| ⋮ | ⋮ |
| BLOCK 29 | DATE 12j |

FILE MANAGEMENT METHOD AND FILES

This application is based on Japanese Patent Application No. 2000-155325 filed on May 25, 2000, the contents of which are hereby incorporated by reference.

BACKGROUND OF THE INVENTION

1. Field of the Invention

The invention relates to file management and filing technology.

2. Description of the Prior Arts

A new kind of files has come into being in recent years where the conditions such as the period of usage and the number of repetitive usages can be arbitrarily set up by the author, wherein files can no longer be used once their periods of usage are expired.

However, those files that are no longer usable due to expiration of their usage periods are still stored in media such as floppy disks and hard disks as they are not automatically removed. This means that they occupy the medians memory areas forever.

Therefore, it is desirable to have such a file that can be automatically deleted without the user's intervention, or a file that can be automatically deleted leaving only information that is necessary for the user.

Among the files where usage periods or number of repetitive usages are set up, popular ones are the files that contain trial version software used for the promotion of software products for potential customers. This means that it would defeat the purpose of such trial files if the contents of the files can be changed or copied. Therefore, it is desirable to have files that prevent any modification or copying the contents of the files.

SUMMARY OF THE INVENTION

The purpose of the invention is to provide a file management method and files that are capable of automatically deleting the files when they become unable to meet their usage conditions and preventing modifications or copying of the files.

According to this invention, a file management method having an application program that is stored in an external memory device of a computer and operates when it is read into the computer consists of a step for accepting the startup instruction for the application; and a step for automatically deleting the application program from the external memory device when the started application completes its operation. This management method is capable of automatically deleting the application program from the external memory device when the started application completes its operation.

According to this invention, the file management method having an application program that is stored in an external memory device of a computer and operates when it is read into the computer further consists of a step for uncompressing a compressed file stored in the external memory device and generating an uncompressed file in the external memory device separate from the compressed file; a step for accepting an instruction for starting up an application in the uncompressed file; and a step for automatically deleting the uncompressed file containing the application from the external memory device as the started application ends. This file management method is capable of starting up the application in the uncompressed file generated by uncompressing the compressed file and deleting the uncompressed file from the external memory device while leaving the compressed file intact as the application ends.

According to this invention, the file management method having an application program that is stored in an external memory device of a computer and operates when it is read into the computer further consists of a step for checking the application's usage restricting condition of the application; and a step for automatically deleting the application program from the external memory device as the started application ends when the application's usage restricting condition of the application is met. This file management method is capable of automatically deleting the application program from the external memory device when the application's usage restricting condition of the application is met.

According to this invention, the file management method having an application program that is stored in an external memory device of a computer and operates when it is read into the computer further consists of a step for uncompressing a compressed file stored in the external memory device and generating an uncompressed file in the external memory device separate from the compressed file; a step for checking the application's usage restricting condition of the application; and a step for automatically deleting the application program from the external memory device as the started application ends when the application's usage restricting condition of the application is met. This file management method is capable of automatically deleting the application program from the external memory device when the application's usage restricting condition of the application is met.

According to this invention, the file management method having an application program that is stored in an external memory device of a computer and operates when it is read into the computer further consists of a step for uncompressing a compressed file stored in the external memory device and generating an uncompressed file in the external memory device separate from the compressed file; a step for checking the application's usage restricting condition of the application in the compressed file; a step for starting up the application when the application's usage restricting condition is not met, modifying the information concerning the application usage restriction inside the compressed file, and automatically deleting the uncompressed file from the external memory device as the application ends; and a step for deleting the compressed file and the uncompressed file from the external memory device when the application's usage restricting condition is met. This file management method is capable of starting up the application and modifying the information concerning the application's usage restricting condition in the compressed file when the application's usage restricting condition is not met.

According to this invention, a file that is stored in an external memory device of a computer and contains an application program that starts up when it is read into the computer consists of information concerning the startup restriction on the application program; a judgment program for judging if the startup restricting condition is met; and an instruction program for outputting an instruction for instructing the computer's control unit to delete the application program from the external memory unit. This file is capable of outputting an instruction for instructing the computer's control unit to delete the application program from the external memory unit.

According to this invention, a file management method that is stored in an external memory device of a computer and contains an application program that starts up when it is read into the computer consists of a step for accepting an instruction for starting up the application; a step for checking the usage restriction on the accepted application; and a step for automatically deleting the application from the external memory device without starting the application when the usage restricting condition is met. This file management method is capable of automatically deleting the application from the external memory device without starting the application when the usage restricting condition is met.

According to this invention, a file management method that is stored in an external memory device of a computer and contains an application program that starts up when it is read into the computer further consists of a step for accepting an instruction for starting up the application; a step for accepting an instruction for terminating the application; and a step for checking the usage restricting condition concerning the number of startups on the accepted application and automatically deleting the application program from the external memory device if it is the last usage. This file management method is capable of checking the usage restricting condition of an accepted application as the started application ends, and automatically deletes said application's program from the external memory device.

DETAILED DESCRIPTION OF THE INVENTION

The embodiments of this invention will described below using the accompanying drawings.

First, let us describe a typical computer to which the file management method and files according to the invention are applied.

Figure 1:
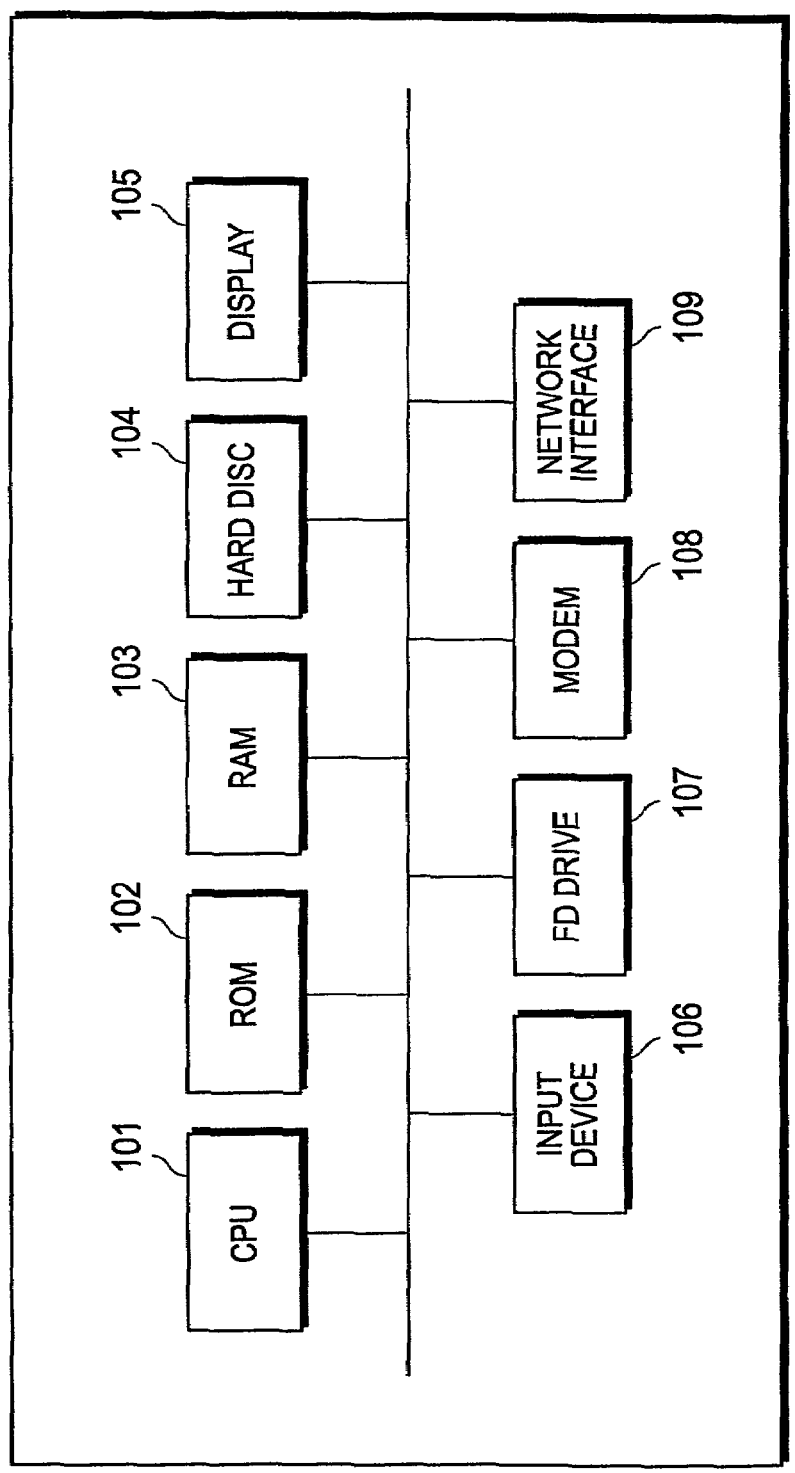
FIG. 1 is a drawing that shows the schematic constitution of a typical computer where a file management method according to the invention is applied.

FIG. 1 is a drawing that shows the schematic constitution of a typical computer 100 where a file management method according to the invention is applied.

The computer 100 contains a CPU 101, a ROM 102, a RAM 103, a hard disk 104, a display 105, a input device 106, a flexible disk drive (FD drive) 107, a modem 108, and a network interface 109, all of which are interconnected via a bus 110.

The CPU 101 is in charge of control and arithmetic operations including reading and executing of programs. The ROM 102 stores control programs and data. The RAM 103 stores programs and data temporarily. The hard disk 104 stores various programs and data including the operating system. The display 105 displays various types of information including the executions of applications by the CPU. The input device 106 includes a pointing device such as a mouse and a keyboard. The FD drive 107 is a device for driving flexible disks. The modem 108 enables the computer to exchange data with other equipment via telephone lines. The network interface 109 is an interface for the computer to communicate with other equipment via the network.

Embodiment 1

Figure 2:
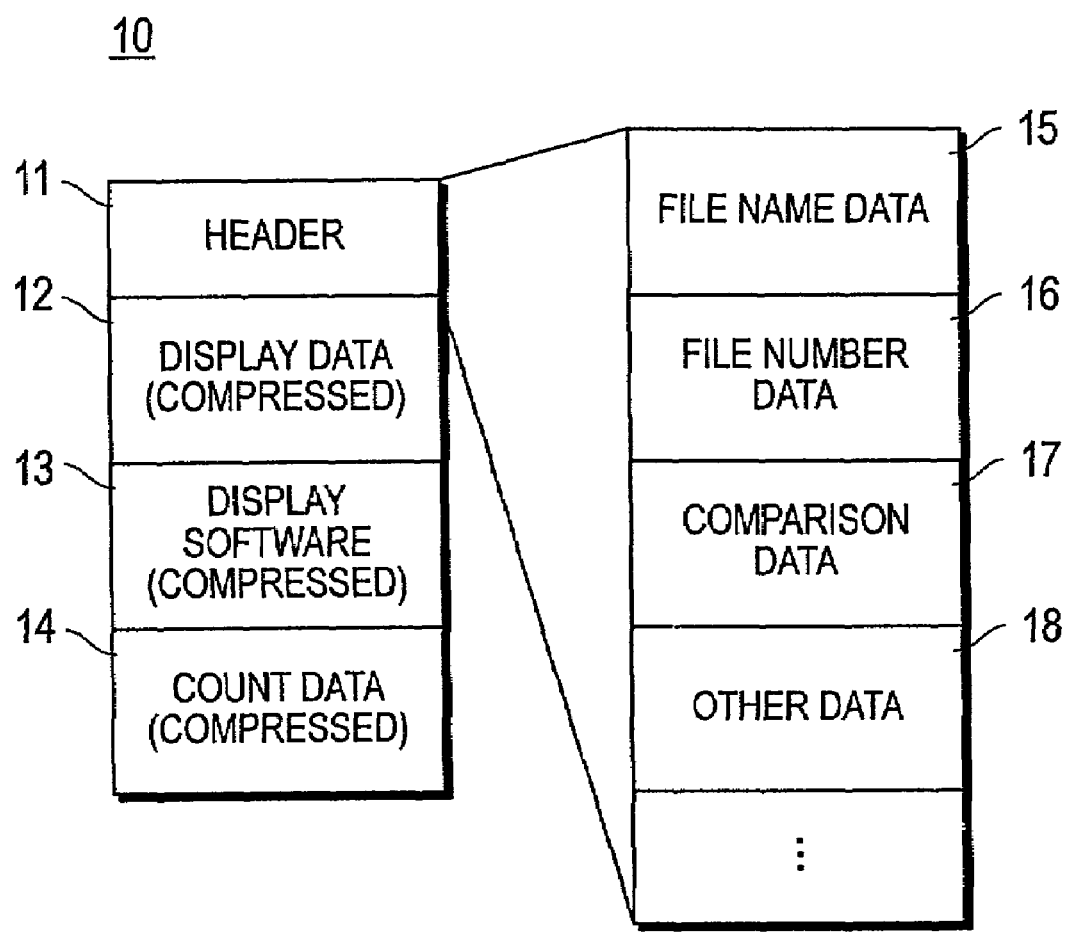
FIG. 2 is a drawing that shows the data structure of a file according to the first embodiment's format.

FIG. 2 is a drawing that shows the data structure of a file 10 according to the first embodiment's format.

The file 10 is stored in the hard disk 104 (external memory device), which is controlled by the CPU 101 of the computer 100.

The file 10 consists of a header 11, a display data 12, which the user views, display software 13 for viewing said display data 12, and a count data 14 for counting the number of usages.

The display data 12 is an image data that is readable only with the help of the display software 13, and is contained in the file 10 in a compressed condition. The display data 12 is generated using image generating software, etc., before the file 10 is generated.

The display software 13 is read-only software for the display data 12, and is able to display the content of the display data 12. The display software 13 protects the display 12 from being recorded, edited, printed or copied. The display software 13 also determines the timing of the deletion of the file 10 and issues an instruction of deletion.

Since the display data 12 and the display software 13 are contained in the same file 10, there is no need to have a special program to use the file 10, so that it is easier to distribute the file 10.

Figure 3:
FIG. 3 is a drawing showing a group of blocks containing data for counting, wherein (A) is the group of blocks before the file is used, and (B) is the group of blocks after the file is used.

FIG. 3 is a drawing showing a group of blocks held in the count data 14, wherein (A) is the group of blocks before the file is used, and (B) is the group of blocks after the file is used.

The count data 14 consists of a group of blocks, each block having the same capacity, as shown in FIG. 3 (A). The display software 13 counts the number of usage of the file 10 by means of deleting one block at a time from this group of blocks each time a display is made. For example, when the number of usage is four, the block 23 will be deleted, making the remaining number of blocks eight as shown in FIG. 3 (B). These blocks are all compressed blocks. The blocks are deleted in the compressed state. The data of these blocks cannot be modified while they are in the compressed state. Therefore, the counting can be done without using the uncompressed data, so that the data cannot be tampered to enable unlimited number of usages. Moreover, even if the file 10 is copied, the number of blocks will also be copied so that the number of usage cannot be reversed or increased.

The header 11 is primarily the area to contain the data concerning the management of the file 10, and includes a file name data 15, a file number data 16, a comparison data 17, and other data 18 concerning said file 10.

The file name data 15 contains an extension data that represents the attribute of the file 10 and the data of the file name that the author assigned to the file.

The file number data 16 is the identification number data of the file 10 to differentiate it from the rest of the files existing in the hard disk 104.

The comparison data 17 is a data to be compared with the count data 14. The comparison data 17 has a data size equivalent to several blocks of the count data 14. The data size of the comparison data 17 is smaller than the data size of the number of blocks that constitute the count data 14, and is equivalent to, for example, one of the blocks. The number of blocks of the count data 14 in the unused condition is set to a number of blocks equivalent to the data size of the comparison data 17 plus the number of usages allowed. The data size that the comparison data 17 has is used for the display software to compare with the total data size of the blocks held by the count data 14. The data size of the comparison data 17 is used for comparing with the total data size of the blocks the count data 14 has. If the data size of the comparison data 17 is equivalent to one block, the file 10 can be used 11 times in case of FIG. 3(A) as the count data 14 has 12 blocks.

Other data 18 includes the date when the file 10 was created, the name of the author, etc.

The data included in the header 11 are all assigned by the author to the file 10 at the time of file creation, and are so designed that they cannot be altered by the user who uses the file 10. Although the file name can generally be altered, but it is so programmed that the display software 13 does not start if the file name is altered.

As can be seen from the above, the file 10 according to this invention is created to include all the data except the data included in the header 11 in a compressed condition. Such a file is generally called a compressed file. Among various compressed files, the file 10 is a self-uncompressing type file, and the extension data the file name data 15 has is typically "exe." When the user specifies the use of the file 10, the uncompressing program contained in the file 10 is automatically executed to uncompress the compressed data into a work area such as the RAM 103 and the hard disk 104. Therefore, the uncompressed file can be operated in the work area while the file 10 is still kept in the compressed state. In other words, two kinds of the file 10 exist on the computer, one in the compressed state and the other in the uncompressed state when the file 10 is in use. In the following description, the one that remains in the compressed state will be called the file 10 and the one in the working area in the uncompressed state will be called the uncompressed file.

Let us now describe the managing procedure for the file 10 concerning this invention.

Figure 4:
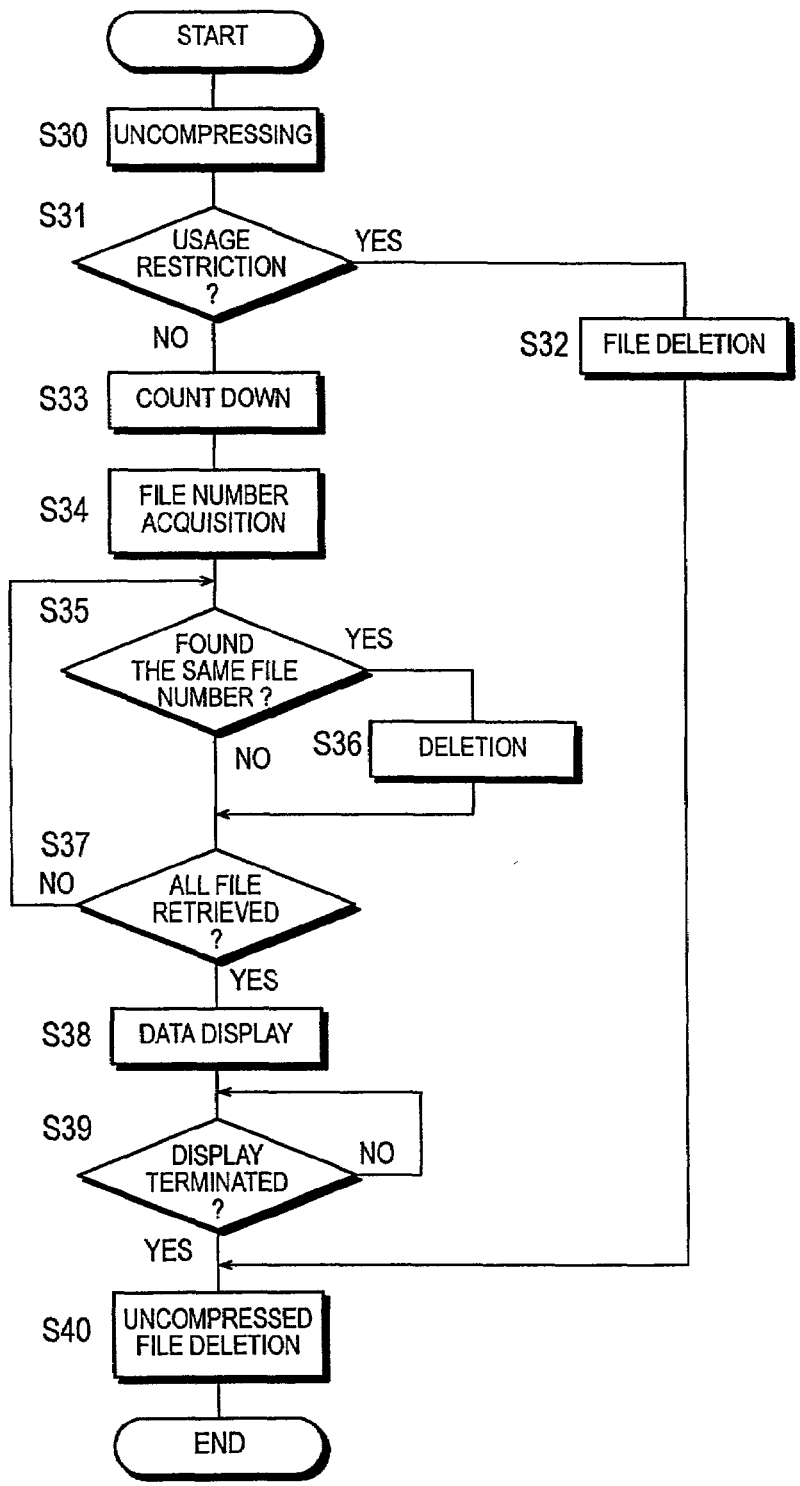
FIG. 4 is a flow chart showing the flow of file usage and deletion in the first embodiment's format.

FIG. 4 is a flow chart that shows the flow of usage and deletion of the file 10 according to the first embodiment.

At the step S30, the file 10 is uncompressed (developed). The operation here is as follows. When the user selects the file 10 using the mouse pointer, etc., while observing the display 105 of the computer 100, the uncompression program contained in the file 10 begins to operate. The uncompressed program then reads the data in the compressed file 10 and writes the data of the uncompressed file into the work area. Therefore, the data of the uncompressed file will operate in the working area.

At the step S31, the display software 13 makes a judgment whether there is any usage restriction on the file 10 based on the comparison data 17. It compares the total data size of the blocks that the count data 14 has as a result of the count down at the step S33 and the data size the relative data 17 has. If the two data sizes are equal, it judges that the number of usages of the file 10 has reached the allowed limit, so that there exists a usage restriction on the file 10 (step S31: Yes), and the system proceeds to the step S32. If the data sizes are not equal, it determines that the number of usages of the file 10 has not reached the allowed limit, so that no usage restriction exists on the file 10 (step S31: No), and the system proceeds to the step S33.

At the step S32, it deletes the file 10 that has reached the allowed number of usages. The display 13 issues here an instruction to the CPU 101 of the computer 100 to delete the file 10 stored in the compressed state. Upon receiving the instruction, the CPU 101 deletes the file 10. As a result of the restriction on the number of usages, the file 10 will be deleted, so that it does not cause a problem of the unusable file occupying a space on the hard disk 104. Later, the uncompressed file in the work area will also be deleted at the step S40. Since this relatively large uncompressed file will be deleted, a wasteful use of the hard disk 104 will be avoided.

At the step S33, it counts down the number of usages of the file 10. In the process of the count down, the display software 13 deletes one of the blocks held by the count data 14 of the file 10.

At the step S34, the display software 13 obtains the file number data 16.

At the step S35, the display software 13 retrieves other files having the same file number data 16 as the file 10 in the hard disk 104 where the file 10 is stored. Here the display software 13 extracts the files having the same file name and extension as those of the file name data 15 to narrow the range of retrieval. Next, it retrieves other files having the identical file number as the file number data 16. The addition of the file name data 15 as a part of the retrieval condition, the retrieval time can be reduced.

When other files having the same file number as the file number data 16 are found (step S35: Yes), it proceeds to the step S36. If no other files having the same file number as the file number data 16 is found (step S35: No), it proceeds to the step S37.

At the step S36, the display software 13 deletes the other files found in the above. The file 10, which is in the compressed state, can be copied. Thus, by deleting all identical copies produced by copying and the file 10 itself except one of them, it can prevent more than two copies of the file 10 from existing on the hard disk 104. Consequently, using the file 10 and one copy of it, it can prevent the number usages of the file 10 from being increased. Thus, illegal usage of the file 10 can be prevented.

At the step S37, a judgment is made whether all other files having the same file number 16 as the file 10 among all the files on the hard disk 104 have been retrieved. If it is confirmed that the retrieval was made for all the files (step S37: Yes), it proceeds to the step S38. If there are any files yet to be retrieved (step S37: No), it returns to the step S35.

At the step S38, the display software 13 displays the content of the display data 12.

At the step S39, it makes a judgment whether the display is finished. If the user instructs the end of the display software 13 or the use of software other than the display software 13 (step S39: Yes), it proceeds to the step S40. If it is judged to be the end of the display (step S39: No), it continues the display.

At the step S40, the uncompressed file will be deleted from the work area and only the file 10 in the compressed state, which has been counted down, remains in the hard disk 104. Since the relatively large uncompressed file will be deleted, wasteful use of the hard disk can be avoided.

Also, other than when the file 10 is used, only the compressed file 10 exists on the hard disk 104, the data in the file 10 cannot be modified. Even when the file 10 is being used, operations except display such as recording, editing, printing and copying of the display data is prevented by the display software. Consequently, it can securely protect the file 10 by preventing the compressed file 10 from being tampered to change the number of usages unlimited or extracting data using the uncompressed file.

Although the format of the first embodiment was described in the above assuming that the display data 12, which is the image data, and the display software 13, which displays its image, are both included in the file 10, the invention is not limited to it. The file 10 can be configured in such a way as not to contain the display data 12 and the display software 13, but rather output an instruction to the control unit (CPU 101) of the computer 100 to delete said file 10 based on the counting data 14 and the comparing data 17.

Although the display software contains a procedure for outputting an instruction to delete the file 10 and a procedure to output an instruction to delete other files that contain the same file number data 16 as the file 10 built into one program, it can also be configured to have only one of the procedures to be built into a program.

At the step S35, the retrieval condition can include, in addition to the file number data 16, not only the file name and the extension, but also the date of the generation of the file 10, the name of the author, etc. The retrieval condition can consist of only the file number data 16, or adding only one of the other retrieval conditions mentioned above. It is also possible to configure the system in such a way that, when other files having the same file number as the file number data 16 are found, it uncompresses such files and compares their contents with that of the uncompressed file and proceeds to the step S36 if they match. Furthermore, it is possible to retrieve other files in the compressed state having the same file size using the file size of the file 10 in the compression state as a retrieval condition.

Furthermore, although the display data 12 was described in the above as an image data, it is not limited to it. For example, it can be document data, voice data, game software, or any combination of them. In such a case, the display software 13 can be arbitrarily modified to software for displaying document data, or reproducing voice data or reproducing the game software.

Furthermore, although the usage restriction on the file 10 is executed by deleting the entire file 10 when the total data size of the blocks of the count data 14, whose block is deleted each time the file 10 is used, matches with the data size of the comparison data 17 preset by the author, the usage restriction can be implemented by other methods as well. For example, it is possible to count the number of usages of the file 10 directly, and executes the usage restriction based on the counted number of usages. Moreover, the usage restriction of the file 10 should not necessarily be based on the number of usages, it can be set up based on a validity period or date of usage.

Figure 5:
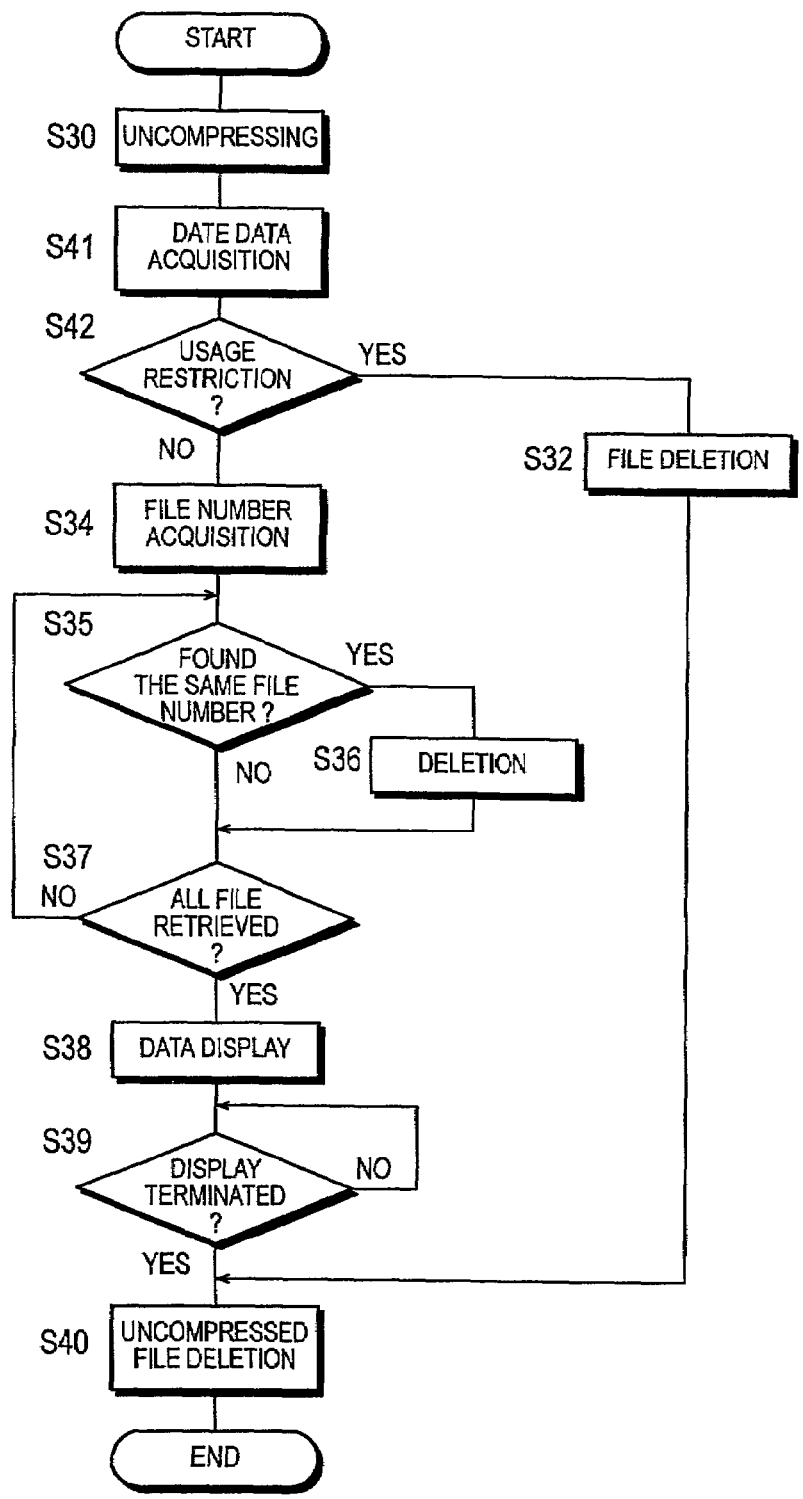
FIG. 5 is a flow chart showing the flow of the file management when a file usage restriction is set up according to the date of usage.

When the limitation of the usage of the file 10 is set up based on a validity date, the management of the file 10 is performed as shown in FIG. 5. In this case, the comparison data 17 of the file 10 is replaced with the validity data so that it can be compared with the date of actual usage of the file 10.

FIG. 5 is a flow chart that shows the management flow of the file 10 when the usage restriction of the file 10 is set up based on the validity date. The operation procedures of FIG. 5, which are the same as those in FIG. 4, are identified by assigning the same numbers and their descriptions are omitted.

At the step S41, the uncompressed display software 13 obtains the date data referencing the clock function used on the computer 101.

At the step S42, the display software 13 makes a judgment on the usage restriction of the file 10 based on the comparison data 17. The display software 13 compares the validity date data held by the comparison data 17 with the date data obtained at the step S41. If the date data exceeds the validity date, it judges that the usage of the file 10 should be restricted (step S42: Yes), and proceeds to the step S32. If the date data does not exceed the validity date, it judges that the usage of the file 10 should not be restricted (step S42: No), and proceeds to the step S34. The following operational procedures are similar to those in FIG. 4.

Although the file 10 was deleted when it is determined that there is a usage restriction as a result of judging if there is a usage restriction for the file 10 at the start of the uncompressed program in the flow chart shown in FIG. 4, the invention is not limited to it. It is possible to configure the system in such a way as to make a judgment whether there is a usage restriction at the end of the display by the display software 13, and to delete the file 10 when a usage restriction is found.

Figure 6:
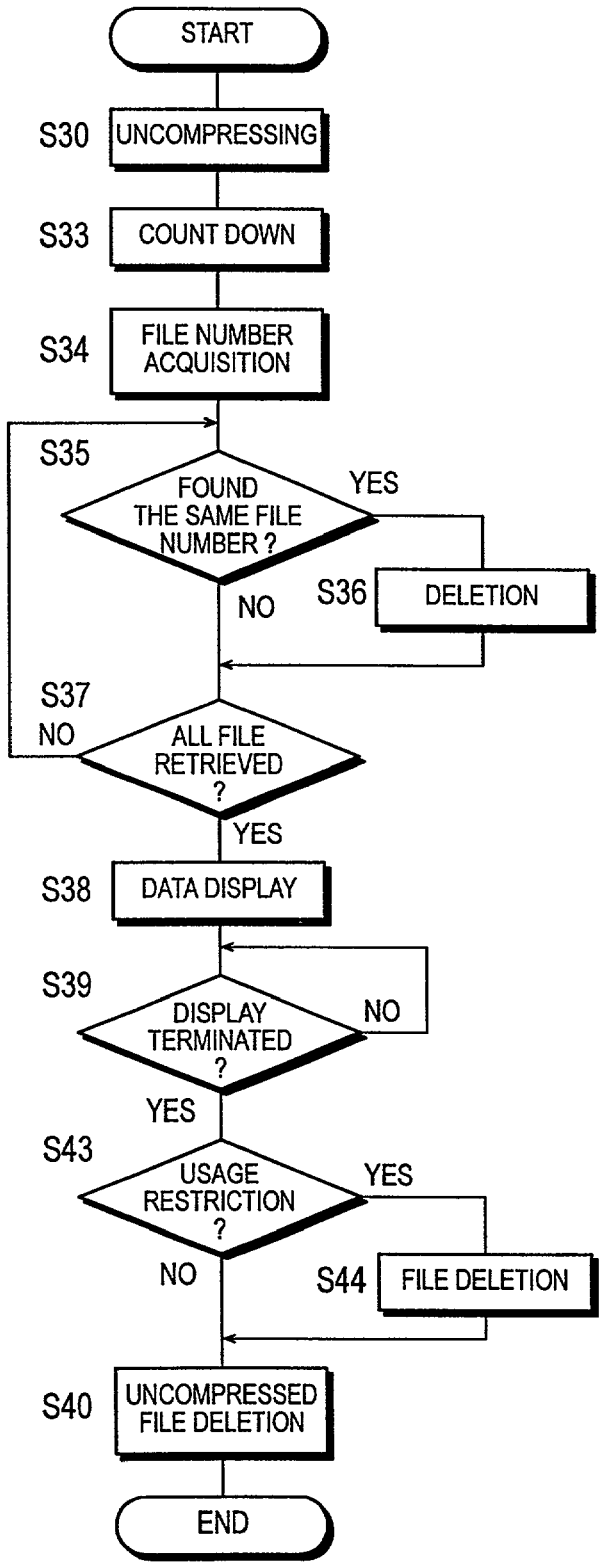
FIG. 6 is a flow chart showing the flow of the file management when a judgment is made whether there is a usage restriction after displaying according to the display software.

FIG. 6 is a flow chart showing the flow of the management of the file 10 when a judgment is made whether there is a usage restriction after displaying according to the display software 13. The operation procedures of FIG. 6 which are the same as those in FIG. 4 are identified by assigning the same numbers and their descriptions are omitted.

At the step S43, a judgment is made whether there is a usage restriction for the file 10 after the display is by the display software 13 is finished at the step S39. Here the data size of the comparison data 17 is compared with the total data size of the blocks the count data 14 has after the count down is performed at the step S33. If the two data sizes match, it is construed that the number of usages for the file 10 has been reached and that the usage restriction for the file 10 exists (step S43: Yes), so that it proceeds to the step S44. If the two data sizes do not match, the system determines that there still remains a certain number of usages for the file 10 and that there is no usage restriction for the file 10 (step S43: No), so that it proceeds to the step S40.

At the step S44, the system deletes the file whose number of usage limit has been reached, i.e., whose useful life has ended. The display software 13 issues an instruction to the CPU 101 of the computer 100 to delete the file 10, which has been kept in the compressed state. The CPU deletes the file 10. As the file 10 will be deleted by the restriction on the number of usages, the inconvenience of having an unusable file in the hard disk 104 forever. After that, the uncompressed file will be deleted from the work area at the step S40. As the relatively large uncompressed file will be removed, the hard disk 104 can be used more efficiently.

Embodiment 2

Figures 7, 8:
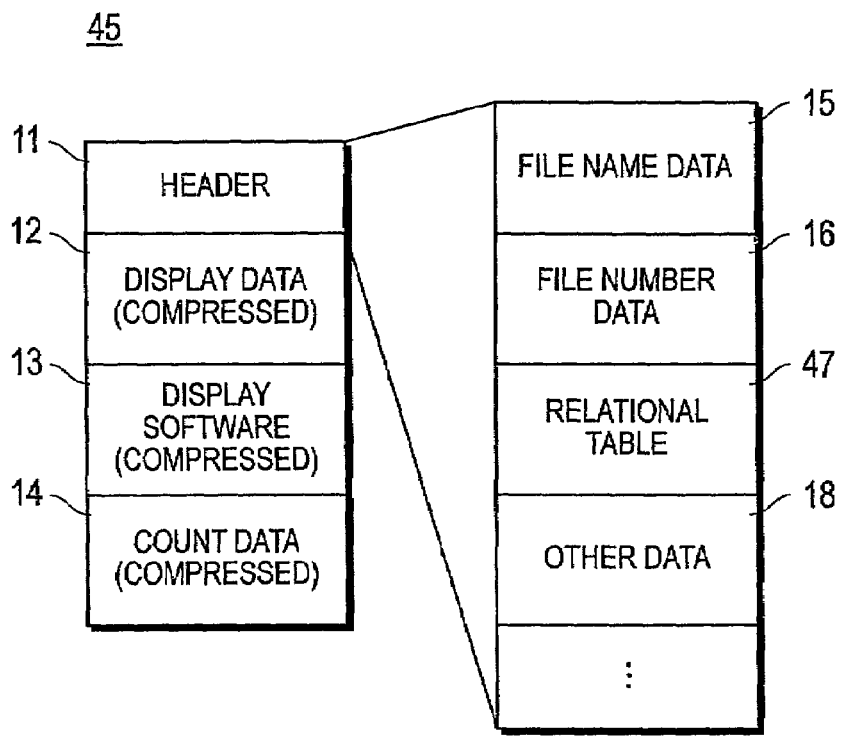
FIG. 7 is a drawing that shows the data structure of a file according to the second embodiment's format.
FIG. 8 is a drawing that shows the file relation table for the second embodiment's format.

FIG. 7 is a drawing that shows the data structure of the file 45 that relates to the second embodiment. The structural elements identical to those of the file 10 of the first embodiment shown in FIG. 1 are identified by assigning the same numbers and their descriptions are omitted here.

The format of the second embodiment is different from that of the first embodiment in that a portion of the data contained in a file is deleted each time said file is used.

The relational table 47 is a table that shows the relation between the blocks the count data 14 has and a portion of the display data 12. For example, each of the blocks 20 through 29 shown in FIG. 3 (A) is related to a portion of the display data 12 as shown in FIG. 8. The data 12a through data 12j are portions of the display data 12.

Figure 9:
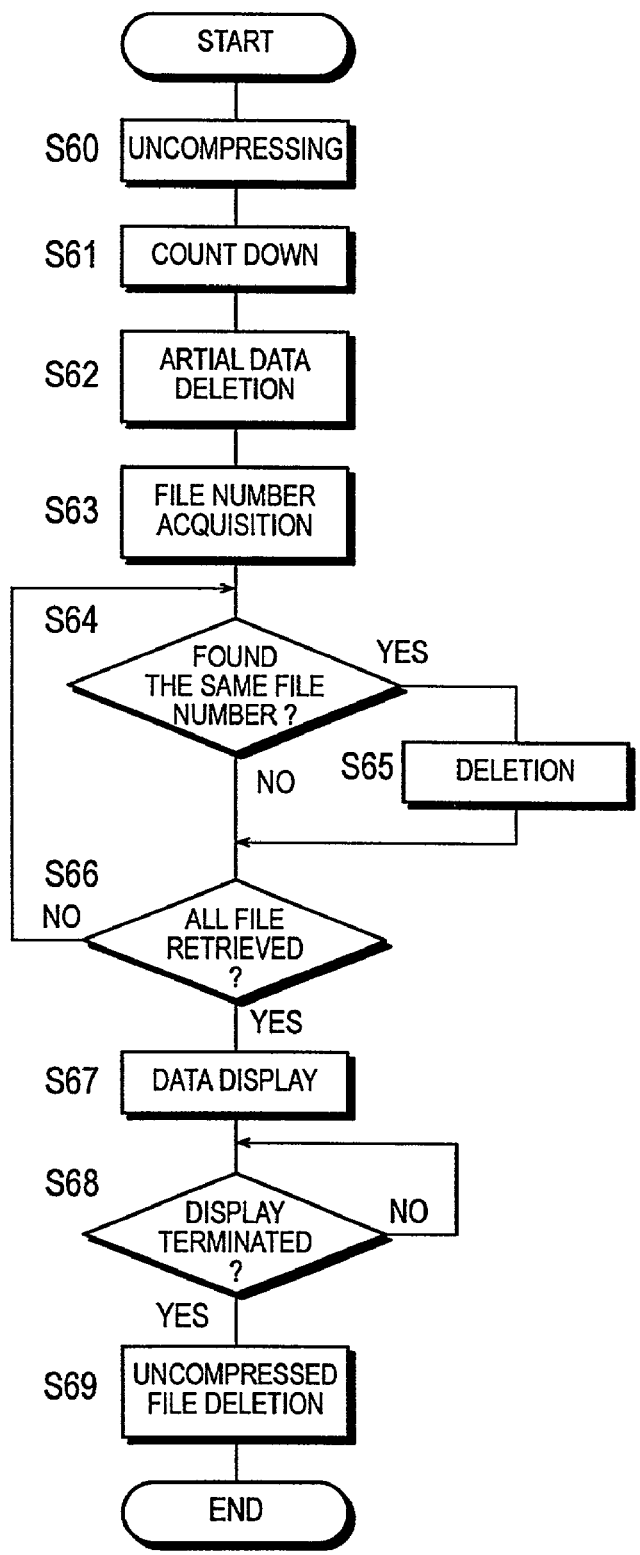
FIG. 9 is a flow chart showing the flow of the file usage and deletion processes in the second embodiment.

FIG. 9 is a flowchart showing the usage and deletion of the file 45 in the second embodiment.

The step S60 is the same as the step S30 of FIG. 4, and the step S61 is the same as the step S33 of FIG. 4; similarly, the steps S63 through S69 are similar to the steps S34 through S40. Therefore, the descriptions for the steps S60, S61, and S63 through S69 are omitted here.

At the step S62, a portion of the display data 12 is deleted. The display software 13 deletes a portion of the display data 12 related to the blocks that are deleted at the step S61 referencing the relational table 47. More specifically, it deletes the data 12a of the display data 12 if the block 20 is deleted.

In other words, the display software 13 deletes the block that the count data has each time when the file 10 is used, and deletes a portion of the display data 12 related to said block referencing the relational table 47. Therefore the data of the display data 12 reduces incrementally as the number of usages of the file 10 increases. The advantage of this method is that the occupancy of the hard disk by the file can be reduced to a minimum by deleting the bulk of the free trial version of the file after the user has experienced it a several times leaving only the advertisement and the instruction on how to order it.

Although it was described for the second embodiment that the display data 12, which is the image data, and the display software 13 to display said image are both contained in the file 45, the invention is not limited to it. The file 45 can be configured in such a way as not to include the display data 12 and the display software 13, but rather to issue an instruction to the control unit to delete a portion of the display data 12 based on the relational table 47.

Furthermore, although it is described that the display software has a procedure to issue an instruction to delete a portion of the display data 12 and a procedure to issue an instruction to delete other files having the same file number data 16 as the file 45 in one program, the display software can have only one of the procedures built into the program.

Furthermore, the display data 12 is not limited to an image data. It can be arranged to have a portion of the text to be deleted; a portion of a melody, or a portion of an introduction, or a measure of a song to be deleted if it is a sound data; a portion of voice data or action command to be deleted if it is game software, in a small increment each time when the file 45 is used.

Although the usage restriction of the file 45 is executed by deleting a portion of the display data 12, which is related to the deleted blocks, based on the relational table 45, it is not limited to it. For example, it is possible to count the number of usages of the file 45 directly and delete a portion of the display data 12 with each count. Moreover, the usage restriction of the file 45 is not necessarily set up according to the number of usages, but also can be set up according to the usage validity date.

Although it is described in the above for the first and second embodiments that the external memory device is the hard disk 104 of the computer 100, it needs not be limited to it. The external memory device can be a flexible disk, ZIP™, MO, DVD, CD-RW, etc.

As described in the above, the invention prevents a wasteful use of an external memory device as a portion or all of a file is automatically deleted from the external memory device when the file usage is restricted.

Furthermore, the invention simplifies the distribution of the file, since the file is generated combining the data to be used by the user and the display software for reading said data, thus eliminating the need for using another program.

Furthermore, the invention prevents illegal use of the file as the data can be read only by means of the display software and the display software is the program dedicated for reading the data, so that it cannot be used when either of them is wrong. Moreover, the invention prevents illegal use of the data as the display software prohibits the recording, editing, printing and copying of the data.

Furthermore, the invention can leave only the necessary information and prevent wasteful use of the external memory device as the data is deleted incremental. The invention can delete the data incrementally based on the number of usages and the validity date.

Furthermore, the invention prevents modification of the content of the file in the compressed state as the program is executed when the file content is uncompressed. Since the file issues an instruction to retrieve other files having specific information and to delete those other files from the external memory device, it prevents the existence of multiple identical files. Therefore, it can prevent the user from illegally using the file by making its copies.

Furthermore, the invention can securely delete other files only as it compares the file's content with other files' contents. Moreover, the invention can specify other files by means of specified information. Further, since the invention executes the program only when the compressed file is uncompressed, it prevents modification of the content of the compressed file.

The disclosure of the Japanese Patent Application No. 2,000-155,325 filed on May 25, 2000 including its specification, claims and summary are incorporated by reference herein in its entirety.

What is claimed is:

1. A method of managing a file stored in a non-volatile memory device of a computer, comprising steps of:
   uncompressing a compressed file stored in the non-volatile memory device to generate an uncompressed file separately from the compressed file in the non-volatile memory device, the uncompressed file comprising an application to be read by the computer to start operation of said application;
   checking reference information relating to a usage restriction of said application, said reference information being contained in a header area of the compressed file;
   initiating the application and modifying usage information contained in the compressed portion of the file in response to the initiation of the application, wherein the usage information is represented by an aggregated number of data blocks of count data, if the application usage restriction condition does not exist, as well as automatically deleting the uncompressed file as the started application terminates its operation; and
   automatically deleting the uncompressed file as the started application terminates its operation if the usage restriction condition exists.

2. The method of claim 1, wherein said usage information comprises a group of blocks in said file.

3. The method of claim 2, wherein the usage information is determined by the number of blocks in said group.

4. The method of claim 3, wherein the step of modifying said usage information comprises deleting one of said blocks from the file during initiation of the application.

5. The method of claim 4, wherein said reference information includes comparison data that designates a predetermined amount of data, and wherein the step of checking comprises comparing the total size of said group of blocks to said comparison data.

6. The method of claim 5, wherein the usage restriction condition exists if said total size is no greater than said comparison data.

7. The method of claim 6, wherein said comparison data is equal to the size of one block.

8. The method of claim 2, wherein each of said blocks is of the same size.

9. The method of claim 2, wherein each block contains compressed data.

10. The method of claim 4, wherein the compressed file includes display data having portions that respectively correspond to said blocks, and further including the step of deleting the portion of the display data that corresponds to a block that is being deleted.

* * * * *